(No Model.)
W. W. CARMAN.
STEAM HEATING RADIATOR.
No. 316,522. Patented Apr. 28, 1885.
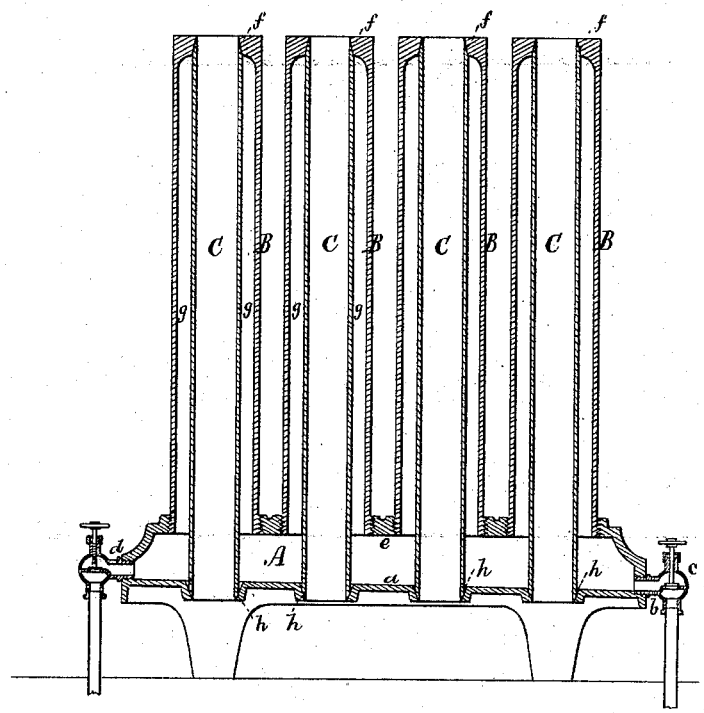
Witnesses
S. N. Piper
Ernest R. Pratt
Inventor.
William W. Carman
by R. H. Eddy atty.

UNITED STATES PATENT OFFICE.

WILLIAM WALLACE CARMAN, OF EXETER, NEW HAMPSHIRE.

STEAM-HEATING RADIATOR.

SPECIFICATION forming part of Letters Patent No. 316,522, dated April 28, 1885.

Application filed January 5, 1885. (No model.)

*To all whom it may concern:*

Be it known that I, WILLIAM WALLACE CARMAN, of Exeter, in the county of Rockingham, of the State of New Hampshire, have invented a new and useful Improvement in Steam-Heating Radiators for Warming Buildings or Apartments Thereof; and I do hereby declare the same to be described in the following specification and represented in the accompanying drawing, which is a vertical section of a radiator of my improved kind, the nature of which is defined in the claims hereinafter presented.

In such drawing, A denotes a hollow or chambered base having an inclined bottom, $a$, leading to an educt, $b$, provided with a stop-cock, $c$. An induct for steam to enter the base is shown at $d$.

Extending upward from the top $e$ of the base is a series of pipes, B, each of which at its lower end is screwed into such top, and at its upper end is closed excepting in having in such end a conical opening or seat, $f$, that increases in width from its upper to its lower end, as shown.

Within each pipe B, and concentric therewith, is another pipe, C, having a diameter somewhat less than that of the bore of the pipe B, in order that within the latter pipe and around the pipe C there shall be a space, $g$. Each pipe C extends upward from the inclined bottom of the base A, and opens through such and the closure of the pipe B. The pipe C is conical at its upper as well as at its lower end, in order that the pipe may closely fit the opening or seat $f$, and also a smaller conical opening or seat, $h$, in the bottom of the base. In screwing the pipe B into the top of the base the pipe C will be forced closely not only into its conical seat in the bottom of the base, but into the conical seat $f$ in the closure of the pipe B. Each pipe C will thereby not only be duly supported within its pipe B, but be forced closely into seats at opposite ends of such pipe C, whereby steam-tight joints can be easily effected at the ends of the pipe.

The inclination of the bottom of the chambered base is to enable the water or condensed steam to pass out of the educt.

The steam in passing through the radiator will heat the pipes B and C, heat being radiated from the external surfaces of the pipes B and from the internal surfaces of the pipes C. Thus air passing up through the pipes C will be raised in temperature thereby, the air surrounding the pipes B being also heated.

I claim—

1. The combination of the chambered base A, provided with the conical seats in its bottom, with the pipes B, screwed into the top of such base and having conical seats in their tops, and with the pipes C, conical at their opposite ends to fit the two sets of seats and placed within the pipes B, all being substantially as set forth.

2. The combination of the chambered base A, provided with the inclined bottom and with conical seats therein, as set forth, with the pipes B, screwed into the top of such base and having conical seats at their upper ends, and with the pipes C, conical at their opposite ends to fit both sets of such seats, and placed within the pipes B, all being substantially as represented.

WILLIAM WALLACE CARMAN.

Witnesses:
H. W. HOWELL,
EDWARD FORD.